(12) United States Patent
Kenmotsu

(10) Patent No.: US 10,488,799 B2
(45) Date of Patent: Nov. 26, 2019

(54) IMAGE FORMING APPARATUS

(71) Applicant: TOSHIBA TEC KABUSHIKI KAISHA, Shinagawa-ku, Tokyo (JP)

(72) Inventor: Takahide Kenmotsu, Fuji Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/257,944

(22) Filed: Jan. 25, 2019

(65) Prior Publication Data
US 2019/0219957 A1 Jul. 18, 2019

Related U.S. Application Data

(63) Continuation of application No. 16/001,030, filed on Jun. 6, 2018, now Pat. No. 10,228,646.

(30) Foreign Application Priority Data

Jan. 17, 2018 (JP) ................................ 2018-005372

(51) Int. Cl.
*G03G 15/00* (2006.01)
*G06F 21/35* (2013.01)
(Continued)

(52) U.S. Cl.
CPC .......... *G03G 15/5016* (2013.01); *B41J 29/38* (2013.01); *G03G 15/5091* (2013.01);
(Continued)

(58) Field of Classification Search
CPC .......... G03G 15/5016; G03G 15/5091; G03G 21/1657; G03G 15/80; G03G 2215/00109;
(Continued)

(56) References Cited

U.S. PATENT DOCUMENTS 7,064,854 B2  6/2006  Idehara
7,106,468 B2  9/2006  Jinbo et al.
(Continued)

FOREIGN PATENT DOCUMENTS

JP  2007-279603 A  10/2007
JP  2014-038558 A  2/2014
JP  2015-195548 A  11/2015

OTHER PUBLICATIONS

Notice of Allowance on U.S. Appl. 16/001,030 dated Oct. 31, 2018.
(Continued)

*Primary Examiner* — G. M. A Hyder
(74) *Attorney, Agent, or Firm* — Foley & Lardner LLP

(57) ABSTRACT

A job storage unit stores a print job. An image forming unit forms a toner image on a sheet. A fixing unit fixes the toner image on the sheet by heating the toner image. A first authentication unit communicates with a communication medium in a first communication range. A second authentication unit communicates with the communication medium in a second communication range. A control unit controls the fixing unit to be heated if the print job associated with user information is stored in the job storage unit when the first authentication unit acquires the user information, and controls the fixing unit to be heated if the print job associated with the acquired user information is not stored in the job storage unit when the second authentication unit acquires the user information.

18 Claims, 6 Drawing Sheets

(51) Int. Cl.
*G06F 1/32* (2019.01)
*B41J 29/38* (2006.01)
*G03G 21/16* (2006.01)
*G06F 3/12* (2006.01)
*G06F 21/60* (2013.01)
*H04N 1/00* (2006.01)

(52) U.S. Cl.
CPC ......... *G03G 15/80* (2013.01); *G03G 21/1657* (2013.01); *G06F 1/32* (2013.01); *G06F 3/1292* (2013.01); *G06F 21/35* (2013.01); *G06F 21/608* (2013.01); *G03G 15/5004* (2013.01); *G03G 2215/00092* (2013.01); *G03G 2215/00109* (2013.01); *G06F 3/1204* (2013.01); *G06F 3/1221* (2013.01); *H04N 1/00954* (2013.01)

(58) Field of Classification Search
CPC ...... G03G 2215/00092; G03G 15/5004; G06F 21/608; G06F 3/1292; G06F 1/32; G06F 21/35; G06F 3/1221; G06F 3/1204; H04N 1/00954

See application file for complete search history.

(56) References Cited

U.S. PATENT DOCUMENTS

| | | |
|---|---|---|
| 2002/0054330 A1 | 5/2002 | Jinbo et al. |
| 2002/0089694 A1 | 7/2002 | Idehara |
| 2011/0286028 A1* | 11/2011 | Kinouchi ............... G06F 21/35 358/1.14 |

OTHER PUBLICATIONS

Search Report dated May 8, 2019 in corresponding European application No. 19 15 2071.7, 8 pages.

* cited by examiner

IMAGE FORMING APPARATUS

CROSS-REFERENCE TO RELATED APPLICATION

This application is a continuation of, and claims priority to, co-pending U.S. patent application Ser. No. 16/001,030, filed Jun. 6, 2018, which claims the benefit of priority from Japanese Patent Application No. 2018-005372, filed Jan. 17, 2018, the entire contents of which are incorporated herein by reference in their entireties.

FIELD

Embodiments described herein relate generally to an image forming apparatus for reducing a standby time of a user when performing a print job.

BACKGROUND

In the related art, an image forming apparatus including an authentication unit of authenticating an IC card in a non-contact manner is known. The image forming apparatus performs user authentication at a time at which a user with the IC card enters a range that can be authenticated, and when a print job associated with acquired user information is stored in a storage unit, heating of a fixing unit starts immediately such that a standby time of a user is reduced.

DETAILED DESCRIPTION

However, since the image forming apparatus starts the heating of the fixing unit at the time of the user authentication only when the print job is stored in the storage unit, for example, when the user performs a function of copying and faxing, the heating of the fixing unit does not start and an unnecessary standby time occurs.

An object of some embodiments described herein is to reduce the standby time of a user when performing the function of the copying and the faxing by performing user authentication at a time when the user with a communication medium, such as an IC card, enters a range that can be authenticated even if the print job associated with acquired user information is not stored in a storage unit.

In order to solve the problem, the image forming apparatus of the embodiment includes a job storage unit, an image forming unit, a fixing unit, a first authentication unit, a second authentication unit, and a control unit. The job storage unit stores a print job. The image forming unit forms a toner image on a sheet. The fixing unit fixes the toner image on the sheet by heating the toner image. The first authentication unit communicates with a communication medium in a first communication range. The second authentication unit communicates with the communication medium in a second communication range. When the first authentication unit acquires the user information, if a print job associated with the user information is stored in the job storage unit, the control unit controls the fixing unit to be heated, and when the print job associated with the acquired user information is not stored in the job storage unit, if the second authentication unit acquires the user information, the control unit controls the fixing unit to be heated.

Hereinafter, embodiments described herein will be described with reference to the drawings.

First Embodiment

In the first embodiment, an image forming apparatus 1 will be described as an example.

For example, the image forming apparatus 1 is a multi-function peripheral (MFP) which can form an image on the sheet by a toner.

Figure 1:
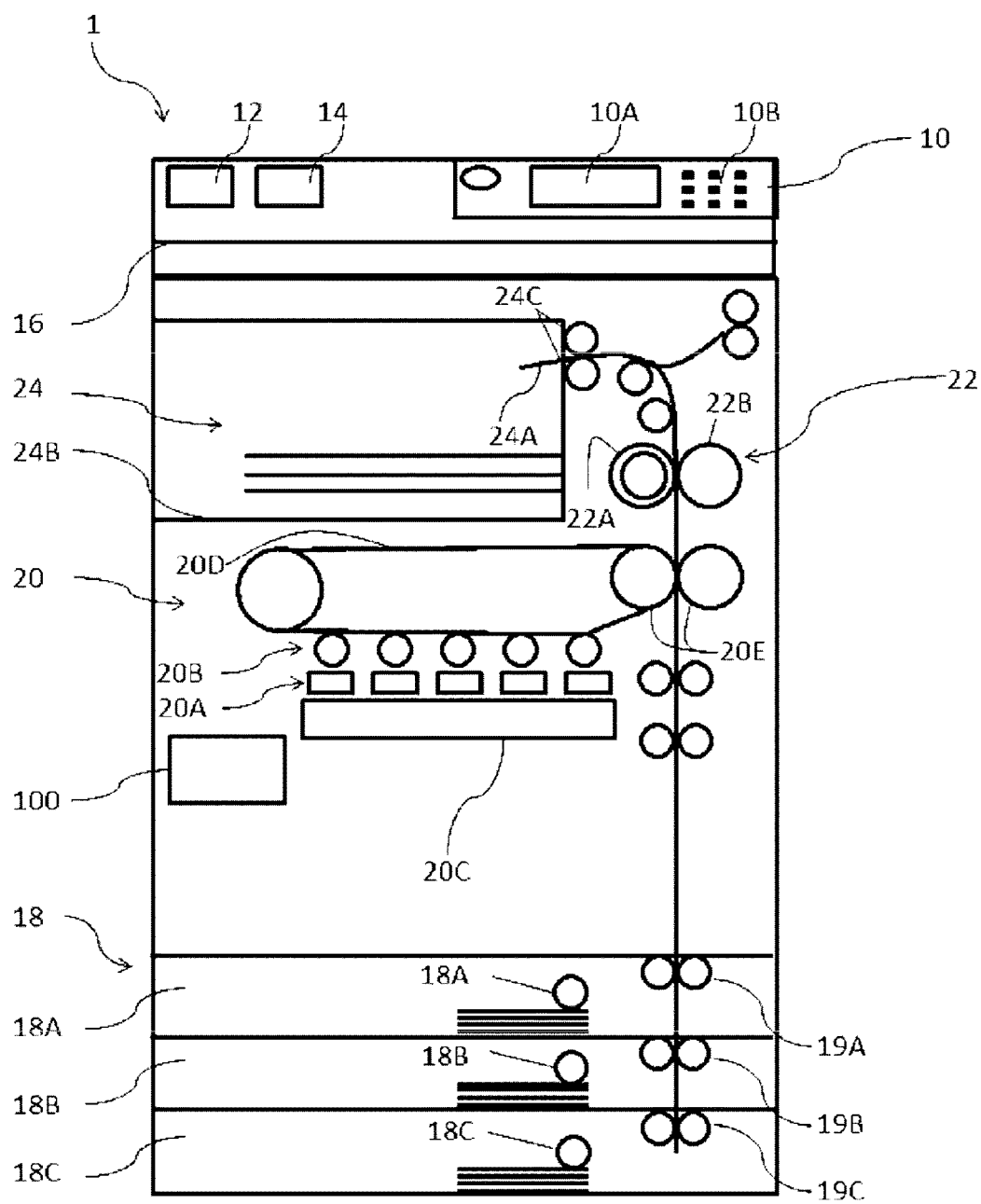
FIG. 1 is a cross-sectional view of an image forming apparatus in a first embodiment.

FIG. 1 is a diagram illustrating the image forming apparatus 1 according to a first embodiment. The image forming apparatus 1 in the present embodiment includes a control panel 10, a first authentication unit 12, a second authentication unit 14, a reading unit 16, a sheet feeding tray 18, an image forming unit 20, a fixing unit 22, and a sheet output unit 24.

The control panel 10 includes a display unit 10A and an operation unit 10B. The display unit 10A is a display device such as a liquid crystal display and an organic electroluminescence display (EL). The display unit 10A displays various types of information relating to the image forming apparatus 1. The operation unit 10B includes a plurality of buttons, and receives an operation of users. The operation unit 10B outputs a signal in response to an operation performed by the user to a control unit 30. The display unit 10A and the operation unit 10B may be configured as an integrated touch panel.

The first authentication unit 12 and the second authentication unit 14 communicate with a communication medium held by the user. For example, the communication medium may be a mobile terminal such as a mobile phone and an IC card. In the following description, the communication medium is described as the IC card. The first authentication unit 12 and the second authentication unit 14 can communicate with the communication medium, and are IC card readers that perform user authentication by communicating with, for example, the IC card. When the user with the IC card enters a range in which the first authentication unit 12 and/or the second authentication unit can perform authentication, the user information is automatically acquired and a corresponding information is transmitted to a user determining unit 40 (which will be described below). In the present description, it is described that an authenticable range of the first authentication unit is wider than the authenticable range of the second authentication unit 14. The first authentication unit 12 may communicate with the IC card in a non-contact manner. The second authentication unit 14 may communicate in a contact or non-contact manner.

For example, the reading unit 16 is a scanner for reading an image of the sheet. The reading unit 16 stores the read image information in a storage unit (not illustrated) that stores the information as image data. The image data stored in the storage unit maybe transmitted to other image processing apparatuses (for example, personal computer) through a network. In addition, the image data stored in the storage unit may be formed on other sheets by the image forming unit 20 (which will be described below).

The sheet feeding tray 18 is provided in a lower portion of a case, and includes a plurality of sheet feeding cassettes 18A, 18B, and 18C. Each of the sheet feeding cassettes 18A, 18B, and 18C accommodates the sheet of a predetermined size and type. Settings of each of the sheet feeding cassettes 18A, 18B, and 18C can be appropriately changed. The sheet feeding cassettes 18A, 18B, and 18C include the pickup rollers 18A, 18B, and 18C, respectively. Each of the pickup rollers 18A, 18B, and 18C receives the sheet one by one from each of the sheet feeding cassettes 18A, 18B, and 18C. Transporting rollers 19A, 19B, and 19C and the pickup rollers 18A, 18B, and 18C transport the received sheet to a transportation path.

The image forming unit 20 is disposed upstream of the fixing unit 22 (which will be described below) along the transportation path. The image forming unit 20 includes a developing unit 20A, a photoconductive drum 20B, an exposure unit 20C, a transfer belt 20D, and a transfer roller 20E. The developing unit 20A is a container for holding toner, and the toner is transferred from the developing unit 20A to the photoconductive drum 20B at the time of development. The exposure unit 20C emits a laser beam and forms an electrostatic latent image on a surface of the photoconductive drum 20B. With +respect to the electrostatic latent image, the developing unit 20A performs the development by adding the toner. The developed toner image is transferred onto the transfer belt 20D (primary transfer). The transfer roller 20E transfers the toner image formed on the transfer belt 20D onto the sheet (secondary transfer).

The fixing unit 22 is disposed downstream of the image forming unit 20 along the transportation path. The fixing unit 22 includes a heating roller 22A and a pressing roller 22B. The heating roller 22A applies heat from a first surface side of the sheet to the sheet. The pressing roller 22B applies pressure from a second surface side of the sheet to the sheet. The fixing unit 22 fixes the toner transferred to the sheet on the sheet when forming an image by the heat and pressure.

The sheet output unit 24 includes a paper discharge port 24A, a paper discharge tray 24B, and a paper discharge roller 24C. The paper discharge roller 24C discharges the sheet from the paper discharge port 24A. The paper discharge tray 24B stacks the sheet discharged from the paper discharge port 24A.

Figure 2A:
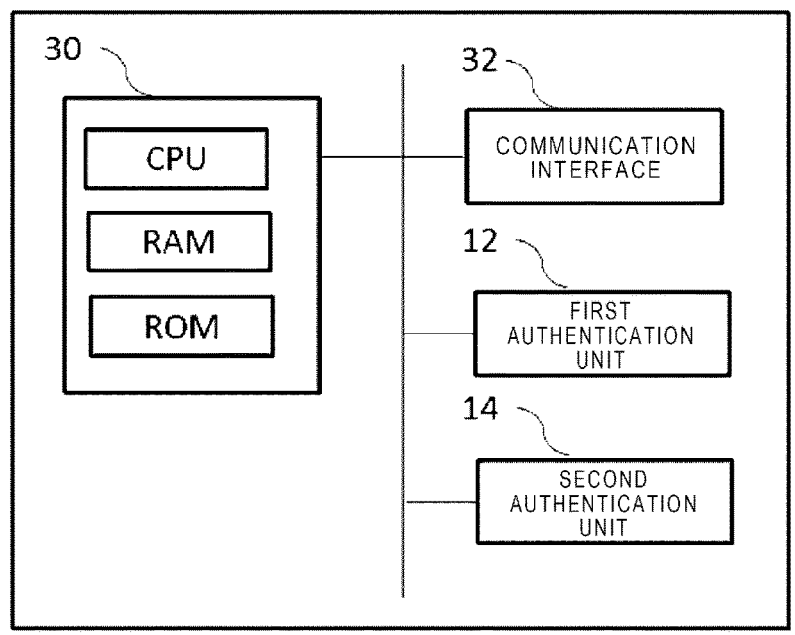
FIGS. 2A and 2B are functional block diagrams of the image forming apparatus in the first embodiment.
Figure 2B:
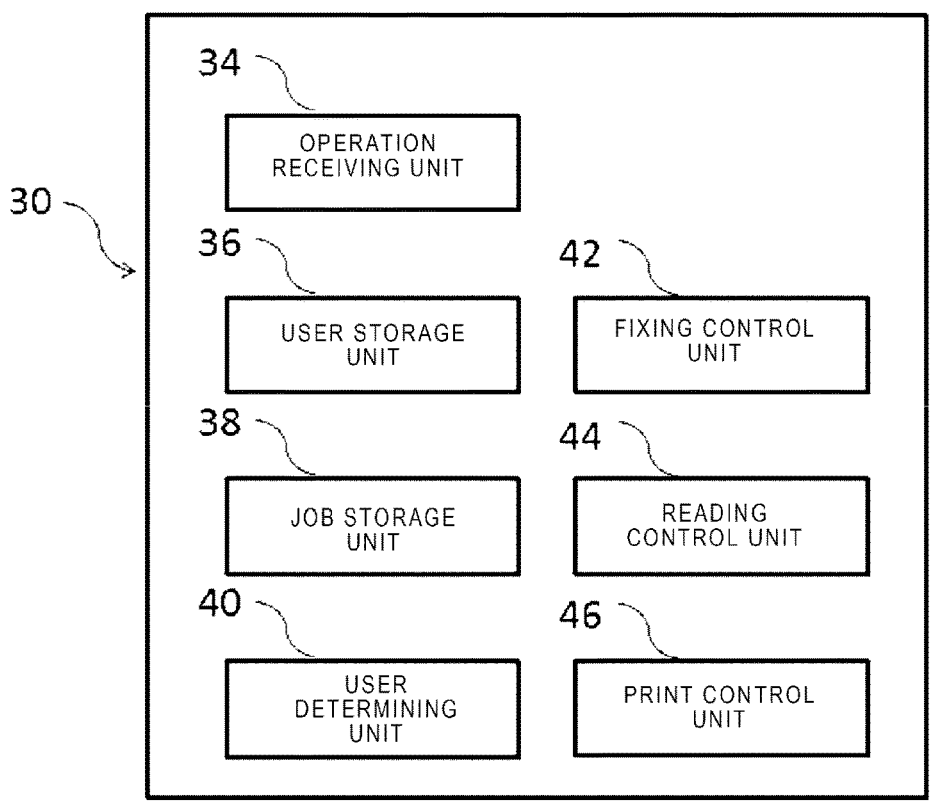

FIGS. 2A and 2B are functional block diagrams illustrating functions of the image forming apparatus 1. In the functional block diagram, FIG. 2A illustrates a hardware configuration, and FIG. 2B illustrates a software configuration. Hereinafter, a description will be given using FIGS. 2A and 2B.

As described in FIG. 2A, the image forming apparatus 1 of the present embodiment includes the control unit 30, a communication interface 32, the first authentication unit 12, and the second authentication unit 14.

The control unit 30 includes a processor including a central processing unit (CPU) or a micro processing unit (MPU) and a memory, for example. For example, the memory may be a semiconductor memory, and may include a read-only memory (ROM) for storing various control programs and a random access memory (RAM) for providing a temporal work area to the processor. The RAM may temporarily store the image acquired by the reading unit 16 (which will be described below). The control unit 30 controls each unit of the image forming apparatus 1 based on the various control programs stored in the ROM.

The communication interface 32 communicates with an external device such as a PC. With this, the image forming apparatus 1 can be connected to the network and acquire jobs such as printing and faxing, and the user information. For example, the communication interface 32 communicates with the external device on the network through a suitable wireless or wired connection such as Bluetooth (registered trademark), infrared connection, and optical connection, in accordance with IEEE 802.15, IEEE 802.11, IEEE 802.3, IEEE 3304, or the like. The communication interface may further include a USB connection unit to which a connection terminal of USB standard is connected, a parallel interface, or the like.

In the following description, a print job, a FAX job, and a copy job are collectively referred to as the print job.

The print job received by the communication interface 32 and an operation receiving unit 34 (which will be described below) are stored in a memory.

Next, as described in FIG. 2B, the image forming apparatus 1 of the present embodiment includes the operation receiving unit 34, a user storage unit 36, a job storage unit 38, the user determining unit 40, a fixing control unit 42, a reading control unit 44, and a print control unit 46. Apart of or all of the following functions maybe realized by a memory or an application specific integrated circuit (ASIC) may be realized.

The operation receiving unit 34 transmits operation information received by the control panel 10 to the control unit 30. For example, the user operates the control panel 10 such that the control unit 30 receives a command for performing the print job.

The user storage unit 36 stores the user information for specifying the user. For example, the user storage unit 36 is configured with the RAM or the like. For example, as the user information, a personal ID may be employed. If the IC card has the same ID, the user determining unit 40 (which will be described below) can perform the user authentication when the first authentication unit 12 and the second authentication unit 14 authenticate the IC card. In the following description, the control unit 30 functions as the user storage unit 36, but embodiments are not limited thereto. The user information may be stored in a host computer connected with the image forming apparatus 1 through a network.

The job storage unit 38 stores the print job acquired from the external device by the communication interface 32. The control unit 30 performs printing according to the print job stored in the job storage unit 38. The job storage unit 38 stores the stored print job at least until the print job is completed.

The user determining unit 40 performs the user authentication based on the authentication information transmitted from the first authentication unit 12 and the second authentication unit 14. For example, the authentication information is the user information. An authentication process is performed by comparing the authentication information transmitted from the first authentication unit 12 and the second authentication unit 14 by the user determining unit 40 and information registered in the user storage unit 36 in advance. When the authenticated result is determined to be coincident, the user can operate the image forming apparatus 1. The user authentication does not necessarily have to be performed in the image forming apparatus 1. For example, the user information is stored in advance on the host computer connected with the image forming apparatus 1 through the network and the user information transmitted from the first authentication unit 12 or the second authentication unit 14 is transmitted to the host computer such that the authentication process may be performed on the host computer.

The fixing control unit 42 controls an operation on the fixing unit 22. For example, heating of the heating roller 22A and rotational driving of the pressing roller 22B are controlled. The fixing control unit 42 can control the fixing unit 22 to increase a temperature of the fixing unit 22 to a temperature to be set in advance.

The reading control unit 44 controls an operation of the reading unit 16. For example, when the sheet to be a reading target is set on the reading unit 16 and a copy job is selected by the operation unit 10B, the reading control unit 44 reads an image of the sheet by driving the reading unit 16.

The print control unit 46 controls an operation of the image forming unit 20. For example, when the copy job is performed by the reading control unit 44 and the image data of the sheet is acquired, the print control unit 46 prints an image on a new sheet based on the image data acquired by driving the image forming unit 20.

Figure 3:
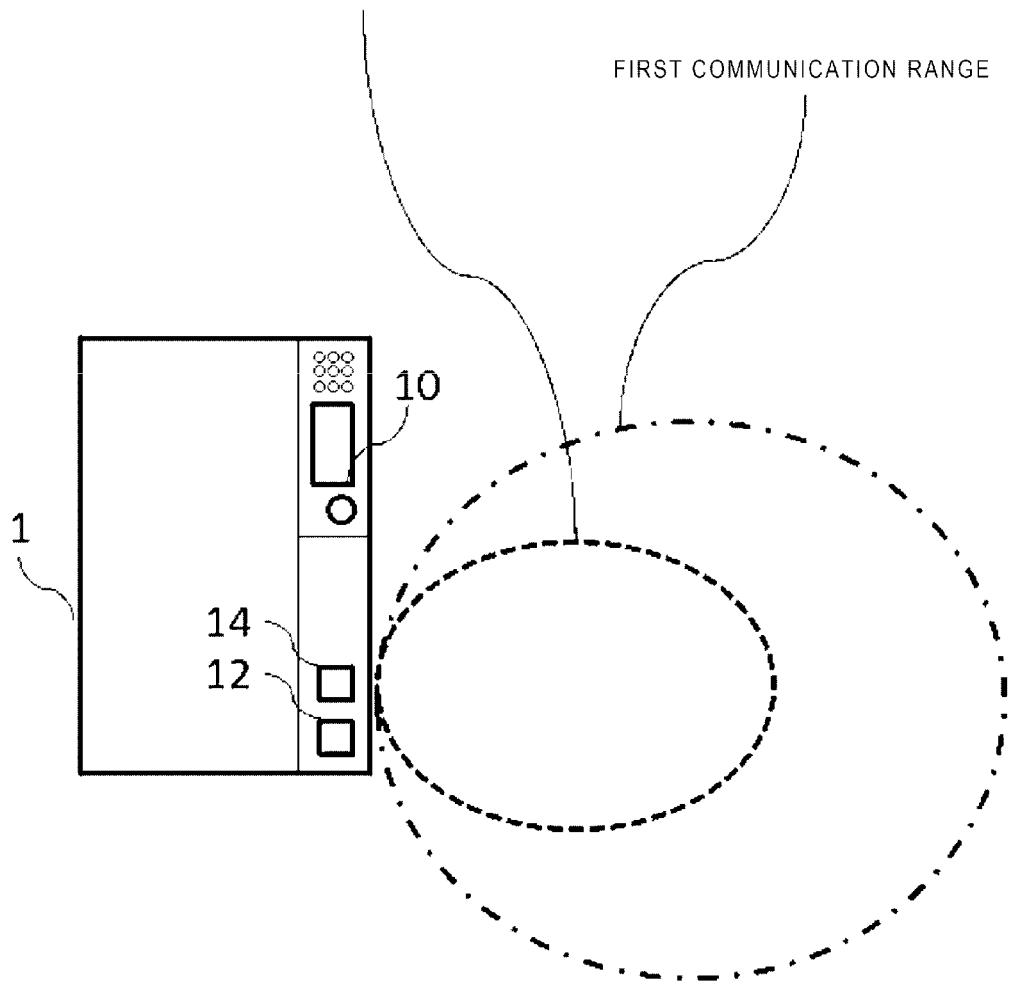
FIG. 3 is a diagram illustrating a first communication range and a second communication range in the first embodiment.

FIG. 3 is a diagram illustrating an example of an authenticable range of the first authentication unit 12 and the second authentication unit 14. FIG. 3 is a view of the image forming apparatus 1 as viewed from above. A range (first communication range) in which the first authentication unit 12 can communicate and the second authentication unit 14 cannot communicate and a range (second communication range) in which the second authentication unit 14 can communicate are indicated by dotted lines. The first authentication unit 12 and the second authentication unit 14 may be realized by one IC card reader.

As illustrated in FIG. 3, the authenticable range of the first authentication unit 12 is set to be wider than that of the second authentication unit 14. When the user with the IC card enters the first communication range, the first authentication unit 12 performs the user authentication by performing communication with the IC card in a non-contact manner. At this time, when the user authentication by the user determining unit 40 is determined to be coincident, the control unit 30 checks whether the print job associated with the user information is stored in the job storage unit 38. When the print job associated with the user information is stored in the job storage unit 38, the fixing control unit 42 controls the heating roller 22A to be heated to a fixing temperature.

If the print job associated with the user information acquired by the first authentication unit 12 is not stored in the job storage unit 38, the fixing control unit 42 controls the heating roller 22A not to be heated. Then, when the user with the IC card enters the second communication range, the second authentication unit 14 performs the user authentication by communicating with the IC card. At this time, when the user authentication by the user determining unit 40 is determined as coincident, the fixing control unit 42 controls the heating roller 22A to be heated until the temperature of the heating roller 22A becomes the fixing temperature. The fixing temperature is a temperature at which the toner image developed on the sheet can be fixed on the sheet.

As described above, even when a person other than a user with the IC card enters the second communication range after the user with the IC card enters the first communication range, unnecessary heating of the fixing unit 22 can be prevented and power consumption can be suppressed.

Figure 4:
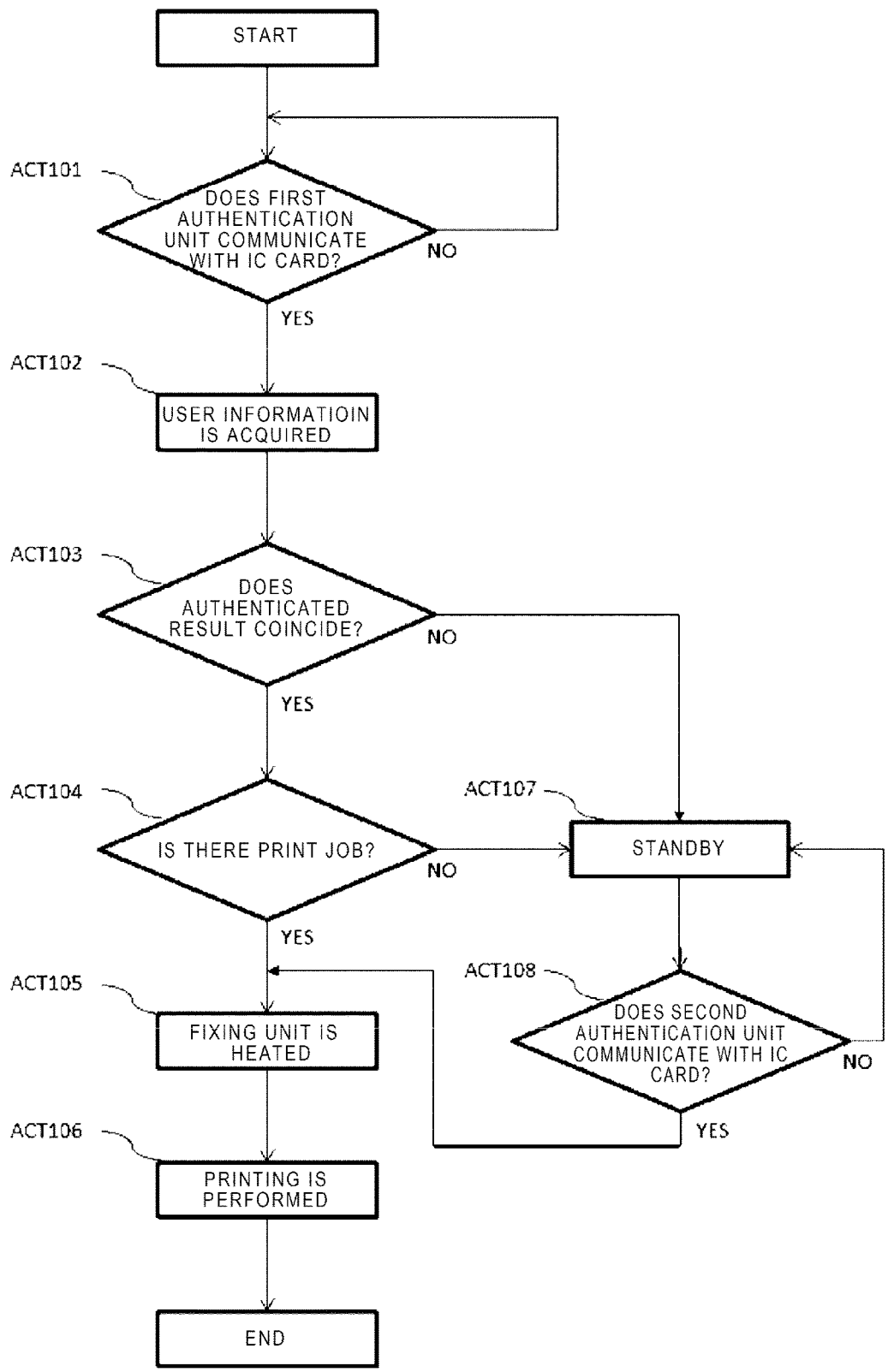
FIG. 4 is a flowchart illustrating a printing process in the first embodiment.

FIG. 4 is a flowchart indicating an image forming process of the image forming apparatus 1. In the following description, it is assumed that the image forming apparatus 1 does not receive the user authentication and stands by in a power saving mode.

The control unit 30 stands by until the first authentication unit 12 communicates with the IC card (Act 101, NO). When the user with the IC card enters the first communication range, the first authentication unit 12 performs communication with the IC card in a non-contact manner (Act 101, YES), and the user information is acquired (Act 102). For example, the user determining unit 40 compares the authentication information transmitted from the first authentication unit 12 and the user information stored in the user storage unit 36 in advance (Act 103), and when the authenticated result is determined as non-coincident, the process proceeds to Act 107 (Act 103, NO). When the authenticated result by the user determining unit 40 is determined as coincident (Act 103, YES), the control unit 30 checks whether the print job associated with the user information authenticated in the job storage unit 38 is stored in the job storage unit 38 (Act 104). If the print job associated with the authenticated user information is stored in the job storage unit 38 (Act 104, YES), the fixing control unit 42 controls the fixing unit 22 to be heated to a fixable temperature (Act 105). Then, when the operation unit 10B receives a print operation from the user, the print control unit 46 performs the print job (Act 106).

In Act 104, when the print job associated with the authenticated user information is not stored in the job storage unit 38 (Act 104, NO), the second authentication unit 14 stands by until the user authentication is performed (Act 107). The second authentication unit 14 stands by until the user with the IC card enters the second communication range (Act 108, NO), and performs communication with the IC card when the user with the IC card enters the second communication range (Act 108, YES), and the fixing control unit 42 starts heating of the fixing unit 22 (Act 105). Then, when the operation unit 10B receives the print operation from the user, the print control unit 46 performs the print job (Act 106). When a printing process in Act 106 is completed, the control unit 30 completes a series of the printing processes.

As described above, in the image forming apparatus in the present embodiment, even when the print job associated with the user information acquired from the communication medium such as the IC card by a first authentication unit is not stored in a job storage unit, and even when a second authentication unit performs functions of the copying and the faxing so as to start the heating of the fixing unit by communicating with the IC card, it is possible to reduce a standby time of user. In addition, when the print job associated with the user information acquired from the communication medium such as the IC card by the first authentication unit is not stored in the job storage unit, even if a person other than the user with the IC card enters the second communication range, the unnecessary heating of the fixing unit can be suppressed and power consumption can be suppressed.

Second Embodiment

When the second authentication unit 14 is authenticated, the image forming apparatus 1 of the second embodiment heats the fixing unit 22 to increase the temperature of the fixing unit 22 to a temperature (second temperature) lower than a normal fixing temperature (first temperature).

The image forming apparatus 1 of the second embodiment includes a temperature sensor (not illustrated) for measuring the temperature of the fixing unit 22. Since the other configurations are the same as those of the image forming apparatus 1 of the first embodiment, description thereof is omitted.

The temperature sensor is a sensor for measuring a surface temperature of the fixing unit 22. For example, as the temperature sensor, a thermistor in contact with the outer peripheral surface of the heating roller 22A may be mentioned. The temperature sensor measures the surface temperature of the center portion in a width direction of the heating roller 22A and temperature information is input to the fixing control unit 42. The fixing control unit 42 controls the temperature of the fixing unit 22 based on the temperature information acquired from the temperature sensor.

For example, when the first authentication unit 12 acquires the user information, if the user storage unit 36 stores the print job associated with the user information, the fixing control unit 42 controls the fixing unit 22 to be heated to the first temperature. Meanwhile, when the first authentication unit 12 acquires the user information, if the second authentication unit 14 acquires the user information in a state where the user storage unit 36 is not stored in the print job associated with the user information, the fixing control unit 42 controls the fixing unit 22 to be heated to the second temperature.

The first temperature is a temperature at which the toner image formed on the sheet is fixed on the sheet. In addition, the second temperature is a temperature which is higher than the temperature of the fixing unit 22 (standby temperature) at the time of a standby state of the image forming apparatus, but a temperature at which the toner image formed on the sheet cannot be fixed on the sheet. The magnitude of the temperature has a relationship of the first temperature>the second temperature>the standby temperature.

Figure 5:
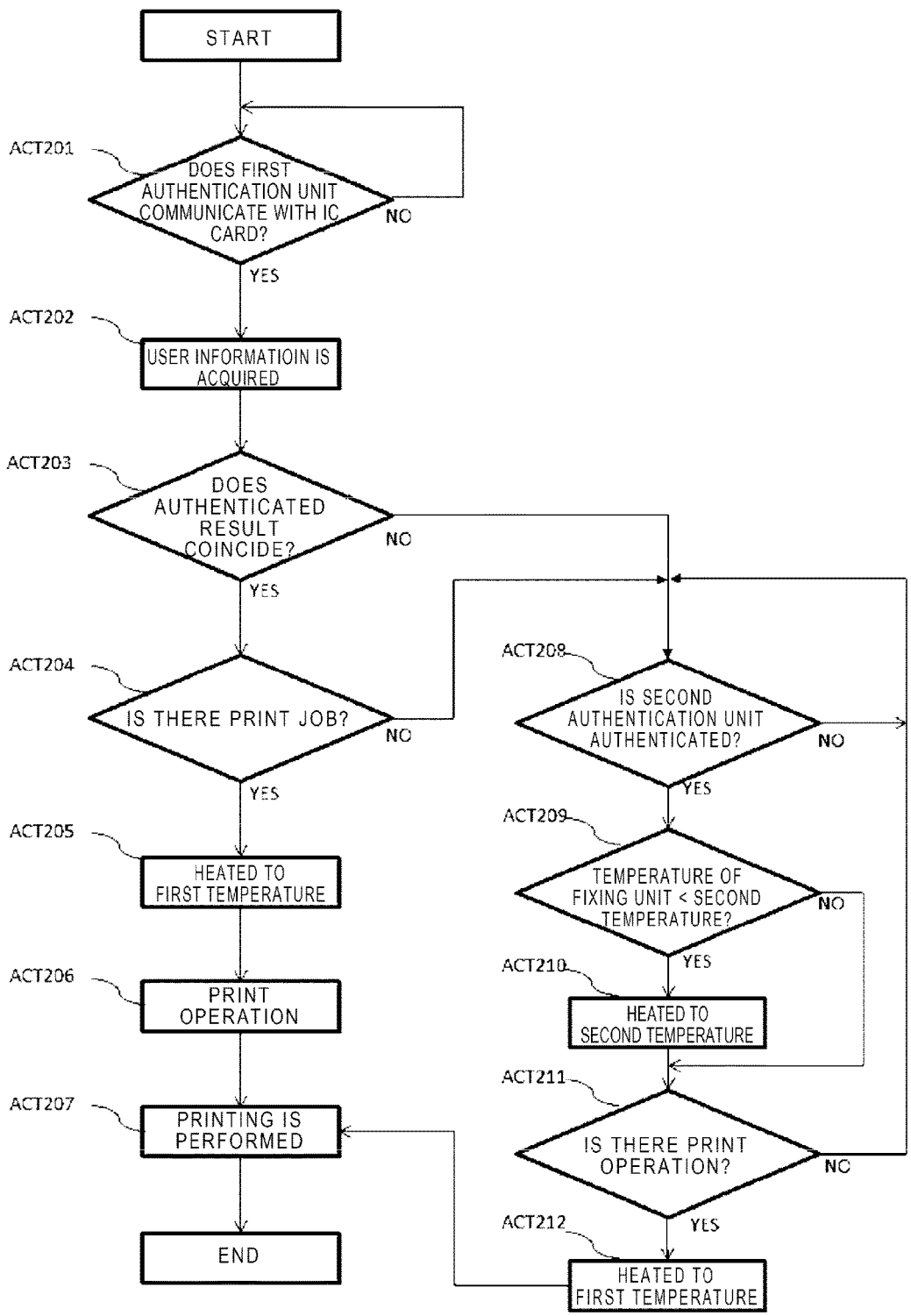
FIG. 5 is a flowchart illustrating a printing process in a second embodiment.

FIG. 5 is a flowchart indicating the image forming process of the image forming apparatus 1. In the following description, it is assumed that the image forming apparatus 1 does not receive the user authentication and stands by in the power saving mode.

The control unit 30 stands by until the first authentication unit 12 communicates with the IC card (Act 201, NO). When the user with the IC card enters the first communication range, the first authentication unit 12 performs the communication with the IC card in a non-contact manner (Act 201, YES), and acquires the user information (Act 202). For example, the user determining unit 40 compares the authentication information transmitted from the first authentication unit 12 and the user information registered in the user storage unit 36 in advance. If the authenticated result is determined as coincident (Act 203, YES), the control unit 30 determines that the print job associated with the user information authenticated in the job storage unit 38 is stored in the job storage unit 38 (Act 204). If the print job associated with the authenticated user information is stored in the job storage unit 38 (Act 204, YES), the fixing control unit 42 starts heating so as to increase the temperature of the fixing unit 22 to the first temperature (Act 205). Then, when the operation unit 10B receives the print operation from the user (Act 206), the print control unit 46 performs the print job (Act 207).

In Act 203, if the authenticated result is determined as non-coincident in the user determining unit 40 (Act 203, NO), the control unit 30 stands by until the second authentication unit 14 performs the user authentication (Act 208).

In Act 204, if the print job associated with the authenticated user information is not stored in the user storage unit 36 (Act 205, NO), the control unit 30 stands by until the second authentication unit 14 performs the user authentication (Act 208).

In Act 208, the second authentication unit 14 stands by until the user with the IC card enters the second communication range (Act 208, NO). When the user with the IC card enters the second communication range, the second authentication unit 14 performs the communication with the IC card (Act 208, YES), the fixing control unit 42 starts the heating of the fixing unit 22. At this time, when the temperature of the fixing unit 22 is a temperature lower than the second temperature (Act 209, YES), the fixing control unit 42 starts the heating to increase the temperature of the fixing unit to the second temperature (Act 210). Meanwhile, if the heat due to the print job performed immediately remains in the fixing unit 22 and the temperature of the fixing unit 22 is already higher than the second temperature (Act 209, NO), the fixing control unit 42 proceeds the process to Act 211 without heating the fixing unit 22. With this, when the user job such as the copying and the faxing is performed, it is possible to suppress the unnecessary power consumption while reducing the standby time.

Then, when the operation unit 10B receives the print operation from the user (Act 211, YES), the fixing control unit 42 controls the fixing unit 22 to increase the temperature of the fixing unit 22 to the first temperature (Act 212), and the print control unit 46 performs the print job (Act 207).

In Act 211, if there is no operation by the user (Act 211, NO), the process returns to Act 208 and the control unit 30 stands by. At this time, the fixing control unit 42 may heat the fixing unit 22 to increase the temperature of the fixing unit 22 to be maintained at the second temperature, and may stop the heating of the fixing unit 22 without maintaining the temperature. When the print job is completed by these processes, the series of the printing processes are completed.

As described above, even when the print job associated with the user information acquired in the first authentication unit is not stored in the user storage unit, if the second authentication unit performs the user authentication, the fixing control unit controls the fixing unit to be heated to the second temperature. Therefore, even when the user performs the print job such as the copying and the faxing, it is possible to reduce a time required for heating the fixing unit to the fixing temperature, and suppress the unnecessary power consumption.

Third Embodiment

The image forming apparatus 1 of the third embodiment includes a timer for measuring a time. The image forming apparatus 1 measures a time from a time at which the print job is completed to a time at which a next job starts, and determines whether or not the fixing unit 22 is heated based on a length of the measured time. Since other configurations are the same as those of the image forming apparatus 1 of the first embodiment or the second embodiment, description thereof will be omitted.

The timer measures a predetermined time. For example, the predetermined time is a time elapsed from immediately after the print job is performed. In the following description, it is described that the CPU measures the time such that a function of the timer is realized.

The storage unit of the present embodiment stores a time set in advance by a developer or the user. For example, the time set in advance is a time from a time at which the print job is completed to a time until the temperature of the fixing unit 22 becomes a temperature less than the second temperature.

Figure 6:
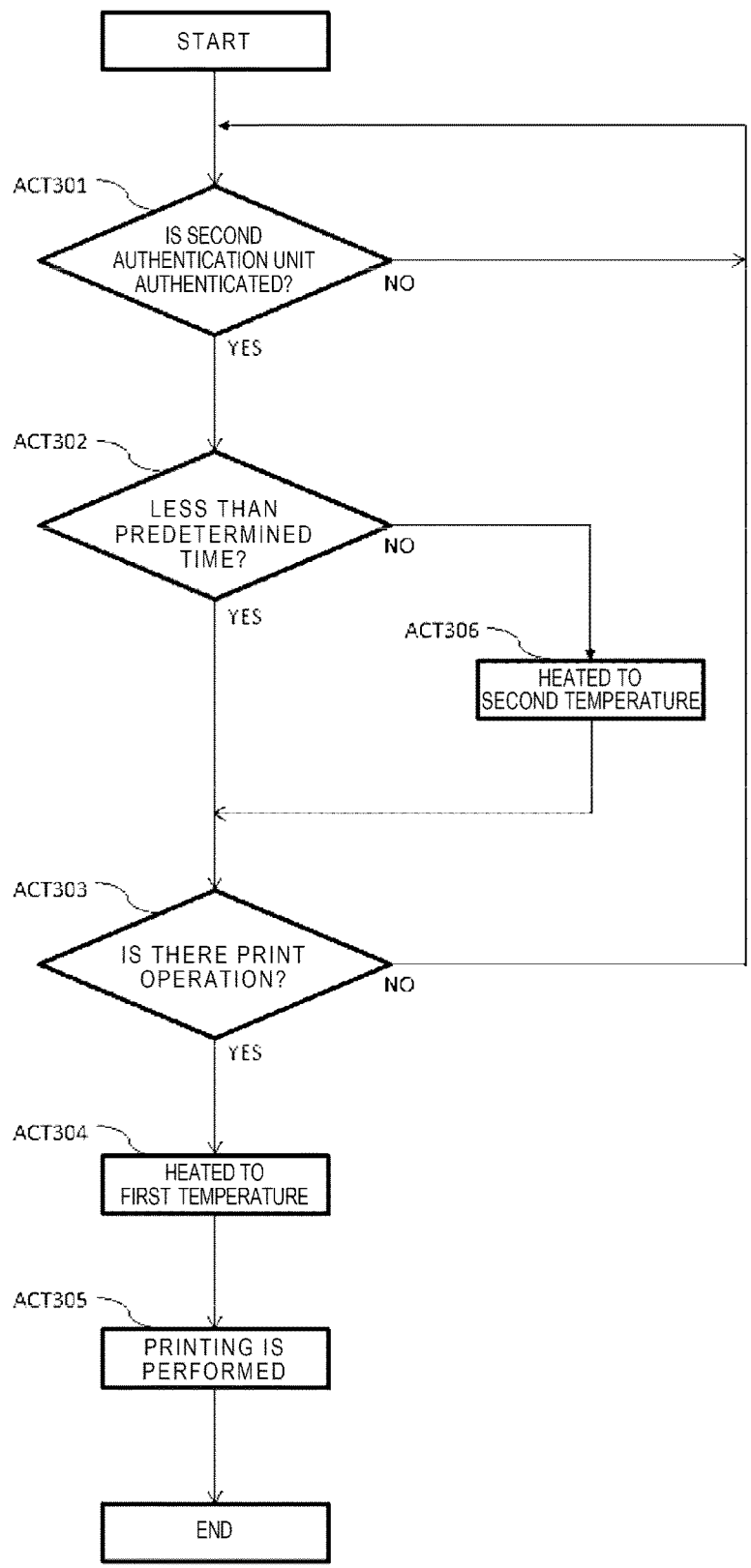
FIG. 6 is a flowchart illustrating a printing process in a third embodiment.

FIG. 6 is a flowchart indicating the image forming process of the image forming process. In the following description, it is assumed that the image forming apparatus 1 does not receive the user authentication and stands by in the power saving mode.

In the present embodiment, since the user information acquired by the first authentication unit 12 coincides with the user information stored in the job storage unit 38 and a process at the time of storing the print job associated with the user information in the job storage unit 38 are the same as the second embodiment, the process is omitted. Therefore, a process at the time of not storing the print job associated with the user information authenticated by the first authentication unit 12 in the job storage unit 38 will be described.

The control unit 30 stands by until the second authentication unit 14 communicates with the IC card (Act 301, NO). When the user with the IC card enters the second communication range, the second authentication unit 14 communicates with the IC card (Act 301, YES). At this time, if the time measured by the timer is less than a predetermined time (Act 302, YES), the fixing control unit 42 proceeds the process to Act 303 without heating the fixing unit 22. In Act 302, if the time measured by the timer is equal to or greater than the predetermined time (Act 302, NO), the fixing control unit 42 starts the heating to increase the temperature of the fixing unit 22 to the second temperature (Act 306).

Then, when the operation unit 10B receives the print operation from the user (Act 303, YES), the fixing control unit 42 starts the heating to increase the temperature of the fixing unit 22 to the first temperature (Act 304). When the temperature of the fixing unit 22 reaches the first temperature, the print control unit 46 performs the print job (Act 305).

In Act 303, if there is no operation from the user (Act 303, NO), the control unit 30 returns the process to Act 301 and stands by. At this time, the fixing control unit 42 may heat the fixing unit 22 so as to maintain the temperature of the fixing unit 22 to the second temperature, and may stop heating of the fixing unit 22 without maintaining at the second temperature. When the print job is completed by performing these processes, the series of the printing processes are completed.

In the heating of the fixing unit 22 in Act 307, similar to the second embodiment, heating is performed to the second temperature, but embodiments are not limited thereto. For example, similar to the first embodiment, the temperature of the fixing unit 22 may be increased to the normal fixing temperature. With this, it is further possible to reduce the standby time of the user.

As described above, even when the print job associated with the user information acquired in the first authentication unit is not stored in the user storage unit, if a predetermined time is passed from the print job being immediately performed, the heating of the fixing unit starts in a case where the second authentication unit performs the user authentication, and if the predetermined time is not passed from the print job being immediately performed, since the temperature of the fixing unit is close to the fixing temperature, even if the second authentication unit performs the user authentication, the heating of the fixing unit is not performed such that it is possible to reduce the standby time of user while reducing excessive heating.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus comprising:
   a job storage memory configured to store a print job;
   an image forming unit configured to form a toner image on a sheet based on the print job stored in the job storage memory;
   a fixing unit configured to fix the toner image formed by the image forming unit to the sheet by heating the toner image;
   a first authentication unit configured to acquire user information by communicating with a communication medium within a first communication range;
   a second authentication unit configured to acquire user information by communicating with the communication medium within a second communication range smaller than the first communication range; and
   a controller configured to, when the first authentication unit acquires the user information, control the fixing unit to be heated to a first temperature, and configured to control the fixing unit to be heated when the second authentication unit acquires the user information to a second temperature lower than the first temperature.

2. The apparatus according to claim 1, further comprising:
   a user determining unit configured to authenticate the communication medium based on authentication information transmitted from the first authentication unit or the second authentication unit.

3. The apparatus according to claim 2, wherein the user determining unit is configured to authenticate the communication medium based on comparing the authentication information transmitted from the first authentication unit or the second authentication unit with information registered in a user storage memory of the apparatus.

4. The apparatus according to claim 1,
   wherein the communication medium includes a mobile terminal.

5. The apparatus according to claim 4,
   wherein the mobile terminal includes one of a mobile phone or an IC card.

6. The apparatus according to claim 1,
   wherein the communication medium includes an IC card, and the first authentication unit and the second authentication unit each comprise an IC card reader.

7. The apparatus according to claim 6,
   wherein the first authentication unit and the second authentication unit comprise a same IC card reader.

8. The apparatus according to claim 1,
   wherein the first authentication unit is configured to communicate with the communication medium in a non-contact manner, and the second authentication unit is configured to communicate with the communication medium in a non-contact manner or in a contact manner.

9. The apparatus according to claim 1, wherein the second temperature is greater than a standby temperature of the fixing unit at a standby state of the apparatus.

10. The apparatus according to claim 1, further comprising:
    a timer configured to measure a time,
    wherein the controller is configured to control the fixing unit to not be heated when a time measured by the timer has not passed a predetermined time when the second authentication unit acquires the user information, when the print job associated with the user information is not stored in the job storage memory at the time of acquiring the user information by the first authentication unit.

11. The apparatus according to claim 1, further comprising:
a temperature sensor configured to measure a temperature,
wherein the controller is configured to not heat the fixing unit when a temperature of the fixing unit measured by the temperature sensor is equal to or higher than the second temperature when the second authentication unit acquires the user information when the print job associated with the user information is not stored in the job storage memory at the time of acquiring the user information by the first authentication unit.

12. A method of operating an image forming apparatus including a job storage memory configured to store a print job, an image forming unit configured to form a toner image on a sheet based on the print job stored in the job storage memory, and a fixing unit configured to fix the toner image formed by the image forming unit to the sheet by heating the toner image, the method comprising:
a first authentication including acquiring user information by communicating with a communication medium within a first communication range;
a second authentication including acquiring user information by communicating with the communication medium within a second communication range smaller than the first communication range; and
when the first authentication acquires the user information, controlling the fixing unit to be heated to a first temperature, and controlling the fixing unit to be heated to a second temperature lower than the first temperature when the second authentication acquires the user information.

13. The method according to claim 12, wherein the first or second authentication includes authenticating the communication medium based on authentication information transmitted from the first authentication or the second authentication.

14. The method according to claim 13, wherein the first or second authentication includes authenticating the communication medium based on comparing the authentication information transmitted from the first authentication unit or the second authentication unit with information registered in a user storage memory of the apparatus.

15. The method according to claim 12,
wherein the communication medium includes an IC card, and the first authentication and the second authentication each comprise reading the IC card with an IC card reader.

16. The method according to claim 15,
wherein the first authentication and the second authentication each comprise reading the IC card with a same IC card reader.

17. The method according to claim 12, further comprising:
measuring a time,
controlling the fixing unit to not be heated when a measured time has not passed a predetermined time when the second authentication acquires the user information, when the print job associated with the user information is not stored in the job storage memory at the time of acquiring the user information by the first authentication.

18. The method according to claim 12, further comprising:
measuring a temperature of the fixing unit, and
not heating the fixing unit when the measured temperature of the fixing unit is equal to or higher than the second temperature when the second authentication unit acquires the user information when the print job associated with the user information is not stored in the job storage memory at the time of acquiring the user information by the first authentication.

* * * * *